United States Patent [19]

McArdle

[11] 4,242,048
[45] Dec. 30, 1980

[54] SEMI-ARTICULATED FLEXSTRAP

[75] Inventor: Francis H. McArdle, Norristown, Pa.

[73] Assignee: The Boeing Company, Seattle, Wash.

[21] Appl. No.: 838,391

[22] Filed: Sep. 30, 1977

[51] Int. Cl.³ .............................................. B64C 27/38
[52] U.S. Cl. .................... 416/134 A; 416/141;
64/12; 74/579 R
[58] Field of Search ................ 416/134, 134 A, 225,
416/141, 103–107; 74/581, 579 R; 64/12, 19;
403/220, 291

[56] References Cited

U.S. PATENT DOCUMENTS

| 989,064 | 4/1911 | Schmalzried | 64/12 |
|---|---|---|---|
| 1,040,136 | 10/1912 | Brown | 416/141 X |
| 1,424,051 | 7/1922 | Wayne | 64/12 |
| 1,602,912 | 10/1926 | Leipert | 64/12 |
| 3,362,253 | 1/1968 | Ditlinger | 74/579 |
| 3,388,615 | 6/1968 | Ditlinger | 74/579 |
| 3,474,507 | 10/1969 | Thompson | 416/225 X |
| 3,518,025 | 6/1970 | Schmidt et al. | 416/131 |
| 3,765,267 | 10/1973 | Bourquardez et al. | 74/581 |
| 3,782,220 | 1/1974 | Ditlinger | 74/579 R |
| 3,879,153 | 4/1975 | Breuner | 416/141 |
| 3,893,788 | 7/1975 | Ditlinger | 416/134 A |
| 3,988,906 | 11/1976 | Smith | 403/291 X |
| 4,029,435 | 6/1977 | Barker | 416/88 |
| 4,038,885 | 8/1977 | Jonda | 74/581 |
| 4,116,018 | 9/1978 | Weible | 64/12 |

FOREIGN PATENT DOCUMENTS 512772  1/1921  France ......................... 416/135

*Primary Examiner*—Everette A. Powell, Jr.
*Attorney, Agent, or Firm*—Robert S. Lipton; Jack D. Puffer

[57] ABSTRACT

A semi-articulated flexstrap for use in connecting a rotor blade to the hub of a helicopter rotor is disclosed. The flexstrap includes a series of straps which alternatingly crisscross at a point between the blade and hub. The straps are substantially parallel to the plane of rotation of the rotor at the crossover point and unrestrained so as to permit relative movement between the straps. The relative movement of the straps of articulation of the flexstrap in the plane of rotation of the rotor permits lead lag motion of the rotor blade to occur.

20 Claims, 5 Drawing Figures

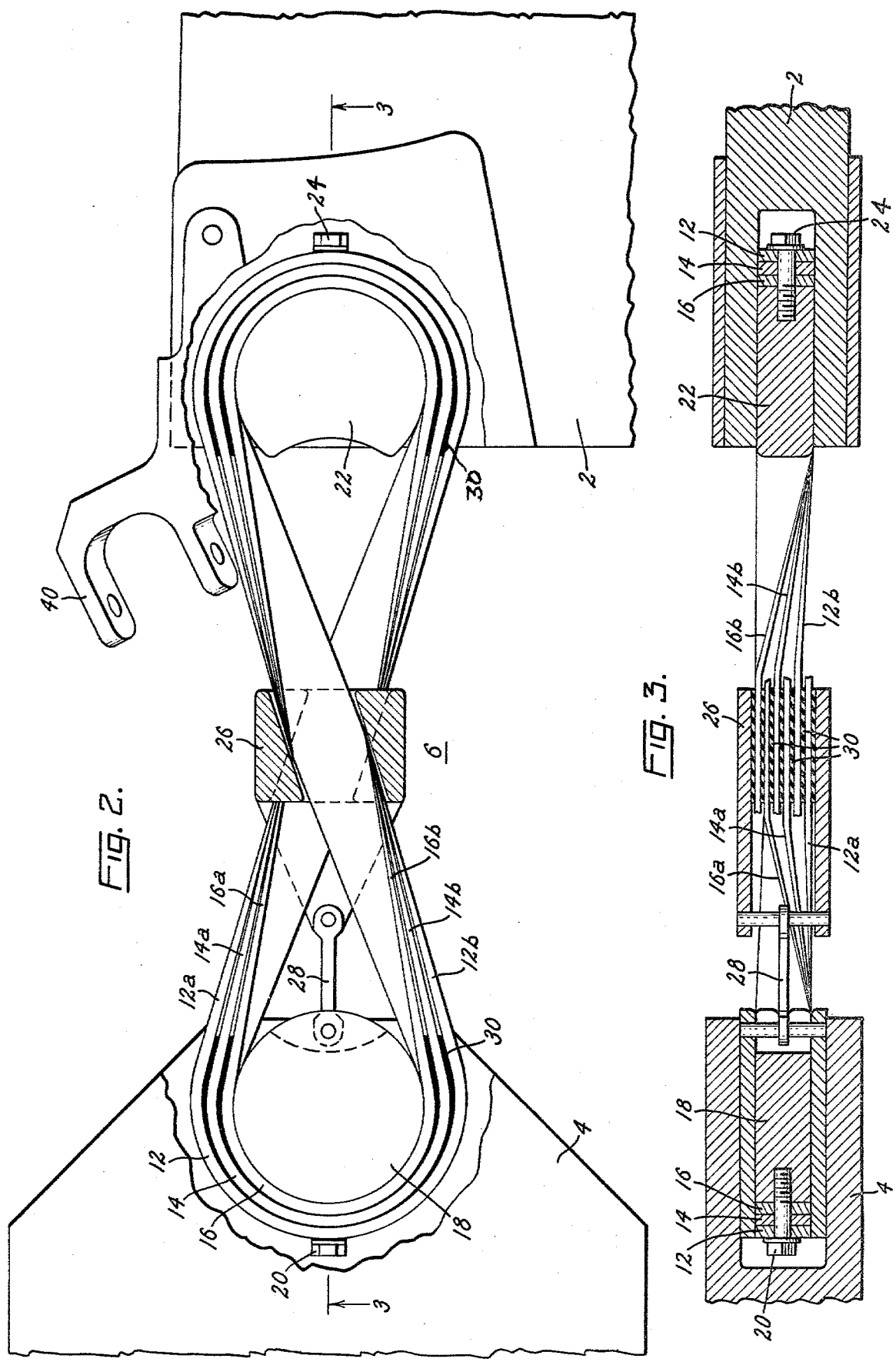

SEMI-ARTICULATED FLEXSTRAP

BACKGROUND OF THE INVENTION

This invention relates to a tension-torsion member in general and a flexstrap for connecting a helicopter rotor blade to a hub in particular.

The rotors of a helicopter rotor system must be permitted three degrees of freedom of movement. Flapping motion or motion in a direction perpendicular to the plane of rotation of the rotor must be permitted. Motion about the rotor blades longitudinal axis, or pitch, is necessary in order to vary the amount of lift generated by a particular blade, and is accordingly necessary in order to control the aircraft. Additionally, lead lag motion or movement of the rotor blade in a direction substantially parallel to the plane of rotation is necessary and must be permitted. One of the primary reasons that flapping and lead lag motion must be permitted is to lower the stresses in the components which secure the rotor blades to the hub.

In conventional helicopters, lead lag, flap and pitch motions are accomplished through hinges which utilize bearings of various types. Due to many problems associated with hinges having bearings such as manufacturing costs, lubrication problems, sizing problems, and difficulty in maintaining manufacturing tolerances, various substitutes were sought.

Among the results of these efforts are the family of rotors known as hingeless rotor systems. Hingeless rotor systems are rotors which permit flapping, lead lag, and pitch motions without the use of conventional hinges. The rotor described in U.S. Pat. No. 3,765,267 issued to Bourquardez and Coffoi issued Oct. 16, 1973, is an example of such a hingeless rotor system. A similar hingeless rotor construction for permitting flap, lead lag, and pitch motions is also taught by Bourquardez and Coffoi in U.S. Pat. No. 3,669,566 issued June 13, 1972.

There are many different constructions for connecting a rotor to a hub without the use of conventional hinges in such a manner so as to permit articulation of the blade with respect to the hub. Some of these constructions have utilized a conventional tension-torsion strap or tie bar. The invention taught by U.S. Pat. No. 3,362,252 to Ditlinger issued Jan. 9, 1968 is an example of such a connecting link. U.S. Pat. No. 3,228,481 issued Jan. 11, 1966 to Eldred shows a tension-torsion strap being utilized in a conventional hinged rotor so as to permit some motion of a rotor blade about its pitch axis. U.S. Pat. No. 3,578,877 issued May 18, 1971 to Mautz also discloses a tension-torsion strap which is used for permitting rotation of a rotor blade about its pitch axis.

There have been various problems associated with hingeless rotor systems which are fully articulated, i.e., which permit flap, lead lag and pitch motions of the rotor blade. In a rotor system it is highly desirable that the degree of force or control loads which are required to rotate the rotor blade about its pitch axis be reduced to a minimum. This has been particularly difficult to achieve in the bearingless flexstrap configurations. In order to reduce the size and weight of the flexstrap of an articulated rotor system, it is necessary that the stresses within the flexstrap be kept to a minimum particularly when the strap is subjected to lead lag and flap motions. Additional, but desirable, features in an articulated flexstrap are control over the placement of the effective lead lag and flap hinge points relative to the hub. As used herein, an effective hinge point is that point about which motion between two members occur.

SUMMARY OF THE INVENTION

The semi-articulated flexstrap of the present invention is particularly adapted to connect a blade to the hub of a rotorcraft, but may be used for other purposes as well. The flexstrap is an arrangement of flexible straps which crosscross or cross over one another. The particular member of straps which is used is a design variable depending upon the particular requirements of the aircraft to which the strap is being applied. Each strap is fixed at one end to the rotor hub and to the root end of the rotor blade at its other end. In the preferred embodiment of the invention some of the straps are integrally connected at the hub and at the rotor blade so that the flexstrap as a whole includes one or more continuous bands each of which crisscrosses itself so as to form the shape of a figure eight in the plane of rotation of the rotor blade. The width of the band or strap lies substantially parallel to the axis of rotation of the rotor hub, at the hub and at the rotor blade root end. However, the straps are rotated ninety degrees so that at the point of crossover they are substantially parallel to the plane of rotation of the rotor. Although the straps are rigidly secured to the hub and to the blade, they are free to move with respect to one another along their length and at the crossover point.

The advantages of the present invention are primarily due to the fact that the straps both cross over one another and are rotated ninety degrees. Flap motions of the rotor blade primarily occur at the crossover point where the straps are flat or parallel with respect to the plane of rotation. Due to the orientation of the straps at this point, the flexstrap as a whole is of minimum thickness thus increasing flexibility and resulting in minimum stress levels within the strap. As the straps are substantially vertical or parallel with respect to the rotor axis of rotation both at the hub and at the blade, bending in the plane of rotation occurs at these locations as a result of lead lag motions of the blade. Since the straps are unconnected to one another at the crossover point, relative movement between them is permitted when the strap bends as a result of lead lag motion of the blade. The vertical orientation of the straps at the hub and at the blade coupled with this relative motion of the straps at the crossover point results in minimal stresses within the strap due to such lead lag motions of the blade.

Although the flexstrap described herein is adapted for use in a fully articulated rotor system, as heretofore defined, the strap itself is referred to as a semi-articulated flexstrap because the relative movement of the straps with respect to one another occurs only when the blade is subjected to lead lag motions.

Rotation of the rotor blade about its pitch axis is accomplished in much the same manner as with other flexstraps, i.e., rotation of the flexstrap itself. However, due to the crossing over or crisscrossing of the straps, the width of the flexstrap as a whole in the plane of rotation of the rotor at the crossover point is substantially reduced, thus reducing the amount of force required to twist or rotate the flexstrap. Of course, this results in lowering the control loads or forces required to rotate the rotor blade about its pitch axis.

Accordingly, it is an object of the present invention to provide a flexstrap for a hingeless rotor system which permits the blade to rotate about its pitch axis, move along a plane perpendicular to the plane of rotation of the rotor, and to move in a plane substantially parallel to the plane of rotation of the rotor.

It is another object of the present invention to provide a flexstrap for connecting a blade to a rotor which results in minimal control loads being required to rotate the rotor blade about its pitch axis.

It is another object of the present invention to provide a flexstrap for connecting a blade to an aircraft rotor which is subjected to minimal stresses when the rotor blade moves in a plane substantially parallel to the plane of rotation of the rotor.

It is still an additional object of the present invention to provide a flexstrap for connecting a blade to the rotor of a rotorcraft having a hingeless articulated rotor system wherein the flexstrap is articulated with respect to lead lag motion in a plane substantially parallel to the plane of rotation of the rotor.

It is a further object of the present invention to provide a flexstrap for connecting a blade to an aircraft rotor which includes straps which cross over one another at a point spaced between the blade and the hub.

It is a further object of the present invention to provide a flexstrap for connecting a blade to a rotor hub which includes straps which crisscross one another and which are oriented parallel to the axis of rotation of the rotor at the hub and blade and rotated ninety degrees at the point of crossover so as to be substantially parallel to the plane of rotation of the rotor.

Other objects and advantages for understanding of the invention will be had by reference to the following description and plans of the preferred embodiments thereof taken in conjunction with the accompanying drawings wherein like references refer to similar parts.

BRIEF DESCRIPTION OF THE DRAWINGS

FIG. 2 is a plan view of the articulated flexstrap of the present invention, partially broken away, connecting a rotor blade to a rotor hub.

FIG. 3 is a side elevation view of the present invention taken along line 3—3 in FIG. 2.

DESCRIPTION OF THE PREFERRED EMBODIMENT OF THE INVENTION

Figure 1:
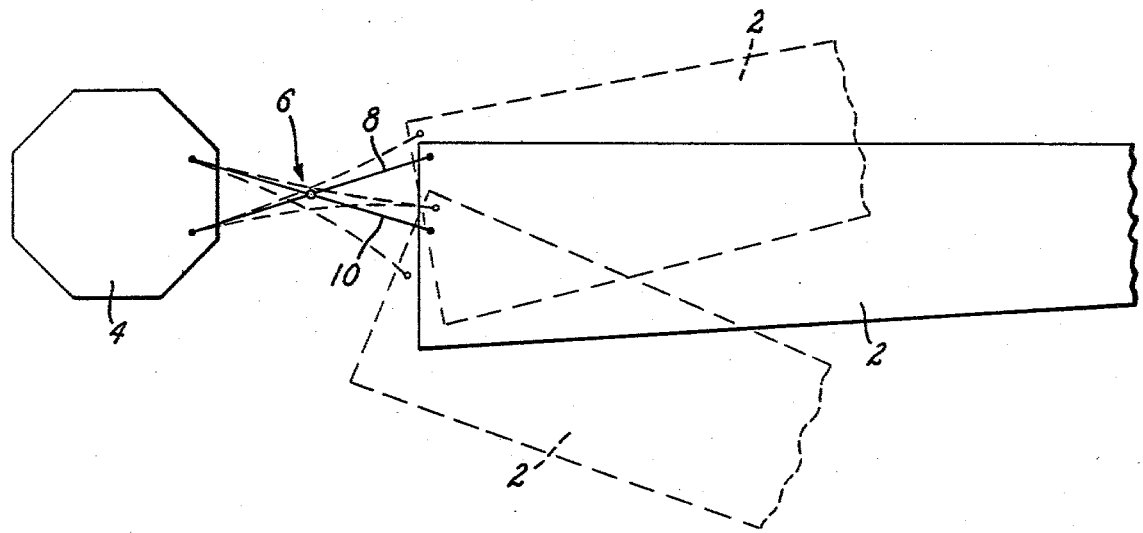
FIG. 1 is a schematic plan view of a rotor system depicting lead lag motion of a rotor blade with respect to the rotor hub.

Although specific terms are used in the following description for the sake of clarity, these terms are intended to refer only to the particular structure of the invention selected for illustration in the drawings and are not intended to define or limit the scope of the invention.

Referring now to the drawings, there is shown in FIG. 1 a schematic representation of a rotor blade 2 and a hub 4. Lead lag motion of the blade in the plane of rotation of the rotor is shown in phantom. The semi-articulated flexstrap 6 of the present invention is shown connecting the blade to the hub 4. The flexstrap 6 is schematically shown as including straps 8 and 10 which overlap or crisscross one another. Strap 8 connects the leading edge of the root of the blade to the hub while strap 10 connects the blade, a point towards the center of the blade, to the hub. As can be seen by the schematic representations in FIG. 1, the straps 8 and 10 of the flexstrap 6 bend when the blade exhibits lead lag motion. As has heretofore been discussed, the straps 8 and 10 are not connected to one another at the point at which they cross over thus permitting relative motion between the two straps. It is this freedom of movement between the straps 8 and 10 which results in a significant reduction of stresses within the flexstrap when lead lag motion occurs. As the width of the strap is substantially reduced at the crossover point, minimal tortional forces are required to twist the flexstrap 6 thus reducing the control loads which are required to rotate the rotor blade about its longitudinal or pitch axis.

The preferred embodiment of the semi-articulated flexstrap 6 of the present invention is shown with greater particularity in FIG. 2. The semi-articulated flexstrap 6 includes three continuous bands, an outer band 12, a middle band 14, and an inner band 16. Each band may be considered as including a pair of crisscrossing or overlapped straps, band 12 includes straps 12a and 12b, band 14 includes straps 14a and 14b, and band 16 includes straps 16a and 16b. Straps 12b, 14b and 16b are schematically represented by straps 8 in FIG. 1 while straps 12a, 14a and 16a are schematically represented by strap 10.

As can be seen in FIGS. 2 and 3, the flexstrap 6 is connected to the hub 4 by placing the flexstrap 6 about a hub attachment fitting 18. The attachment fitting 18 is circular so as to permit and facilitate the bending of the straps around the fitting when lead lag motion occurs thus lowering the stresses which the strap is subjected to. The flexstrap 6 is shown secured to the hub attachment fitting 18 by a bolt 20 which passes through bands 12, 14 and 16 and threadably engages the fitting 18. The hub attachment fitting 18 may be secured to the hub 4 by any suitable means. Although the flexstrap 6 is secured to the fitting 18 by the bolt 20, other means may be used so long as movement of the bands with respect to the fitting 18 is prevented.

In a similar manner the flexstrap 6 is secured to a blade attachment fitting 22. The flexstrap 6 is secured to the attachment fitting 22 by a bolt 24 which passes through the bands 12, 14 and 16 and threadably engages the fitting 22. The blade attachment fitting 22 may also be secured to the blade 2 by any suitable means.

The curved surface of the hub attachment fitting 18 is parallel to the hub axis of rotation. The curved surface of the blade attachment fitting 22 is also substantially parallel to the hub axis of rotation, subject to variances due to the pitching motion of the blade. This, it is apparent that each of the bands 12, 14 and 16 has their edgewise face substantially parallel to the axis of rotation at the hub attachment fitting 18 and the blade attachment fitting 22. In between these two points each of the straps of each of the bands is rotated 90 degrees so that the edgewise face of the strap is flat or substantially parallel to the plane of rotation when the two straps of each band cross over one another. The relationship of the individual straps of the bands 12, 14 and 16 at the crossover points may best be seen in FIG. 3.

In order to properly position and maintain the proper crossover point a harness 26 is provided. The harness 26 itself is properly positioned and secured to the hub by a link 28 which is appropriately secured to the hub 4 and the harness 26.

It is necessary to provide means to facilitate movement of the straps relative to one another. This is necessary in order to prevent fretting or excessive wearing of the straps. This also has the effect of reducing friction or stresses between adjacent straps thus facilitating the lead lag articulation which is desired. There are various means available to accomplish this objective including the use of means for spacing the straps apart from one another and the use of lubricants. A cloth lubricator 30 has been used in the preferred embodiment as both a means of lubrication and of spacing adjacent straps apart from one another. The cloth lubricator 30 is a fabric which has been impregnated with a fluoro-plastic resin. One such product is marketed commercially under the trade name Fabroid, as particularly can be seen in FIG. 3. The cloth lubricator is required at the crossover area so as to permit straps 12b, 14b and 15b to move relative to straps 12a, 14a and 15a. The cloth lubricator may be secured to one of the straps between which is acting as a spacer. This may be accomplished in any suitable manner. The cloth lubricator is also positioned between the various straps at the hub attachment fixture 18 and the blade attachment fixture 22, so as to prevent fretting at these locations when bending occurs.

For certain particular rotorcraft design conditions, it may be desirable for damping to be introduced into the flexstrap design. This may be required to avoid vibration problems and the like. Damping may be introduced by substituting an elastomeric material for the cloth lubricator 30. By bonding an elastomeric material to the straps between which it is located, relative movement will still be permitted while some resistance to that movement is provided.

Figure 4:
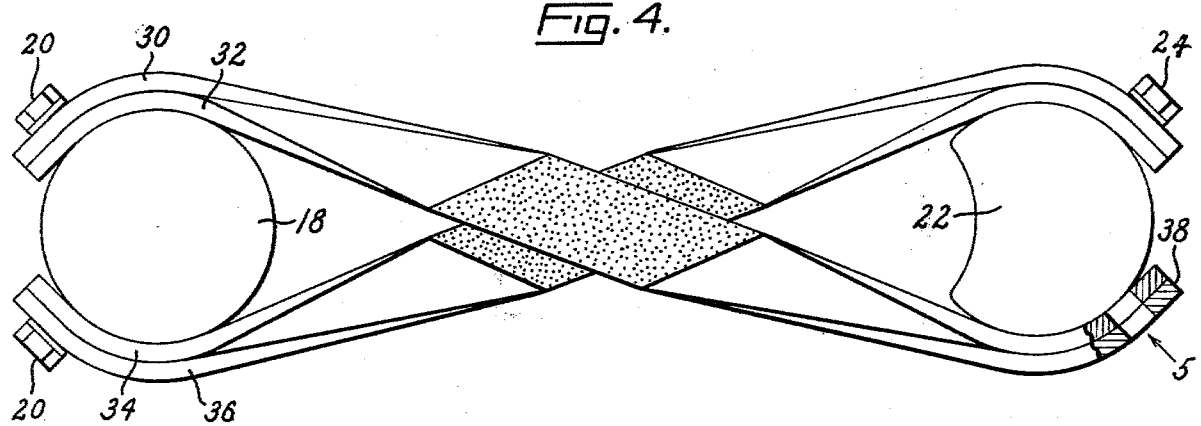
FIG. 4 shows a plan view of an alternate embodiment of the semi-articulated flexstrap of the present invention.
Figure 5:
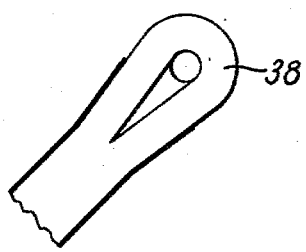
FIG. 5 depicts a portion of the embodiment of the invention shown in FIG. 4.

An alternative embodiment of the present invention, is depicted in FIG. 4. In this embodiment the straps do not form continuous loops or bands. Additionally, in this embodiment the equivalent of two bands, or four straps 30, 32, 34 and 36 are shown. Each of the straps is secured to the hub attachment fitting 18 by a bolt 20 and connected at its opposite end to the blade attachment fitting 22 by bolt 24. Each of the straps 30, 32, 34 and 36 have a loop 38 formed at its end for engaging the bolts 20 and 24. Although this embodiment is functionally the same as the preferred embodiment, it may present easier manufacturing problems.

As may be best seen in FIG. 2 the center line of the flexstrap is located along line 3—3. The flexstrap should be connected to the rotor blade 2 so that the center line of the flexstrap 6 is coincident with the pitch axis of the rotor blade, or as close thereto as is practical. The rotor blade 2 is caused to rotate about its pitch axis by control loads which are applied to a pitch arm 40. The pitch arm is connected to the aircraft control system by means not shown. As has heretofore been mentioned, it is highly desirable that the torsional stiffness of the flexstrap 6 be minimized so as to reduce the control forces which must be applied to the pitch arm 40. Due to the narrowness of the flexstrap 6 in the crossover area, the torsional stiffness of the flexstrap is significantly reduced.

As the rotor blade moves with respect to the hub in the plane of rotation in lead lag motion, it is readily apparent that the straps 12a, 14a and 16a will slide with respect to straps 12b, 14b, and 16b as the entire flexstrap 6 bends in the plane of rotation of the rotor. This obviously results in reduced stiffness of the flexstrap 6 with respect to lead lag motions.

As the straps which make up the flexstrap 6 are flat or parallel to the plane of rotation at the crossover area, the flexstrap 6 is flexible with respect to flapping motions of the blade along planes perpendicular to the plane of rotation.

It is thus readily apparent that the flexstrap 6 permits a rotor blade to be fully articulated with respect to a hub without the use of conventional hinges.

The straps or bands of the present invention may be constructed from a variety of materials. It is contemplated that they will be made from various forms of advanced composite materials. Fiberglass strands impregnated with an epxoy resin is used in the preferred embodiment of the invention. Where the straps form a continuous band it is contemplated that they will be made from continuous uni-glass fibers which form a continuous loop about the entire band. Additional circumferential windings will be used about the band in the areas of retention at the hub attachment fitting 18 and the blade attachment fitting 22. The circumferential windings will also be used in the areas of the strap where significant bending occurs, as in the crossover area. For added strength, a cross ply matrix of fiberglass fibers will also be used in the crossover area of the flexstrap. Stainless steel straps may also be used as an alternate material for the straps or bands.

As is readily evident, the length, width and various other dimensions of the flexstrap may be varied in accordance with design requirements. By varying the dimensions of the flexstrap as a whole as well as the dimensions of the individual straps and materials which are used the effective hingepoints may be varied. For example, the location of the effective hingepoint about which lead lag motions occur, may be varied simply by changing the location of the crossover area of the straps. Of course, this will also vary the location of the effective hingepoint about which flapping motion occurs. The ability to easily locate the effective hingepoints about which the rotor blade articulates is of great importance in rotorcraft design.

Although the present invention has been described with reference to the particular embodiments herein set forth, it is understood that the present disclosure has been made only by way of example and that numerous changes in the details of construction may be resorted to without departing from the spirit and scope of the invention. Although the articulated flexstrap of the present invention has been shown and described as applied to a rotorcraft such as the helicopter, it is to be understood that the invention may be applied and utilized in other areas. Thus, the scope of the invention should not be limited by the foregoing specification, but rather only by the scope of the claims appendage thereto.

What is claimed is:

1. A rotor for an aircraft which comprises:

a blade;

a hub;

a first strap adapted to be connected to said hub and to said blade; and a second strap adapted to be connected to said hub and to said blade, said second member overlapping said first member at a crossover point located between said blade and said hub so as to permit relative movement between said first and second members; and wherein said first and second straps at said crossover point are each twisted approximately ninety degrees with respect to an end thereof.

2. The rotor of claim 1 wherein said first and second straps at said crossover point have their flat surfaces opposing one another.

3. The rotor of claim 2 which further includes a material interspersed between said first and second straps at said crossover point.

4. The rotor of claim 3 wherein said material is an anti-fretting material which is in contact with said first and second straps so as to prevent excessive wearing of said straps.

5. The rotor of claim 4 wherein said anti-fretting material is a cloth lubricator.

6. The rotor of claim 3 wherein said material is a damping material which is in contact with said first and second straps so as to damp the relative motion therebetween.

7. The rotor of claim 6 wherein said damping material is an elastomer.

8. The rotor of claim 1 which further includes a harness which first encompasses said first and second straps at said crossover point so as to permit relative motion between said straps.

9. The rotor of claim 7 which further includes a harness which encompasses said first and second straps at said crossover point so as to permit relative motion between said straps.

10. The rotor of claim 1 wherein said straps are made of a composite material.

11. The rotor of claim 1 wherein said straps are made of steel.

12. In a rotor including a rotor blade having a blade attachment member, and a pitch axis; and a rotor hub having a hub attachment member, an axis of rotation and a plane of rotation; a flextrap for connecting the rotor blade to the rotor hub which comprises:

a continuous band, having the shape of a figure eight, including a pair of loops and a crossover point where a portion of said band overlaps another portion of said band, the plane of said band being substantially parallel to the plane of rotation at said crossover point, one of said pair of loops being rigidly secured to the hub attachment member, and the other being rigidly secured to the blade attachment member, thereby positioning said crossover point between the hub attachment member and the blade attachment member, and permitting relative movement of one portion of said band to the other portion of said band at said crossover point when the blade rotates in the plane of rotation of the hub, whereby control forces and loads within the flexstrap are reduced when the blade is caused to rotate about its pitch axis.

13. The flexstrap of claim 12 wherein, that portion of said band forming said loop connected to the hub attachment member is substantially parallel to the axis of rotation of the hub, and wherein the portions of the band at said crossover point are substantially parallel to each other and to the plane of rotation.

14. The flexstrap of claim 13 which further includes a harness at said crossover point, said band being encompassed by said harness so as not to restrain relative movement of the portions of the harness so encompassed thereby.

15. The flexstrap of claim 14 wherein an anti-fretting material is interposed between the overlapping portions of said band at said crossover point, thereby preventing excess wearing of said band due to relative movement of portions thereof.

16. The flexstrap of claim 15 wherein an elastomeric damping material is interposed between the overlapping portions of said band at said crossover point, thereby restraining and damping relative movement thereof.

17. The flexstrap of claim 14 which further includes support means connected to the hub and to said harness, thereby aiding in properly positioning said harness.

18. The flexstrap of claim 14 which further includes a second band having the shape of a figure eight including a pair of loops and a crossover point where a portion of said second band the plane of said second band being substantially parallel to the plane of rotation at said crossover point overlaps another portion of said second band, one of said loops of said second band being rigidly connected to the hub attachment member and the other loop of said second band being rigidly secured to the blade attachment member, said second band being concentrically oriented with respect to said band, said second band being encompassed by said harness, said band and said second band being connected to said hub and blade attachment members so that relative movement between said bands is permitted except where said bands are connected to said attachment members.

19. The flexstrap of claim 14 wherein said band is comprised of a first and a second strap each of which is rigidly connected, at their opposite ends, to the hub attachment means and said blade attachment means, and said first and second straps cross over one another at said crossover points.

20. The flexstrap of claim 18 wherein said band is comprised of a first and a second strap each of which is rigidly connected, at their opposite ends, to the hub attachment means and said blade attachment means, and said first and second straps cross over one another at said crossover points; and wherein said second band is comprised of third and fourth straps each of which is rigidly connected, at their opposite ends, to the hub attachment means and said blade attachment means, and wherein said third and fourth straps cross over one another at said crossover point.

* * * * *